Nov. 4, 1947. L. H. SNYDER 2,430,194
ELECTRIC HOT PLATE
Filed May 2, 1945
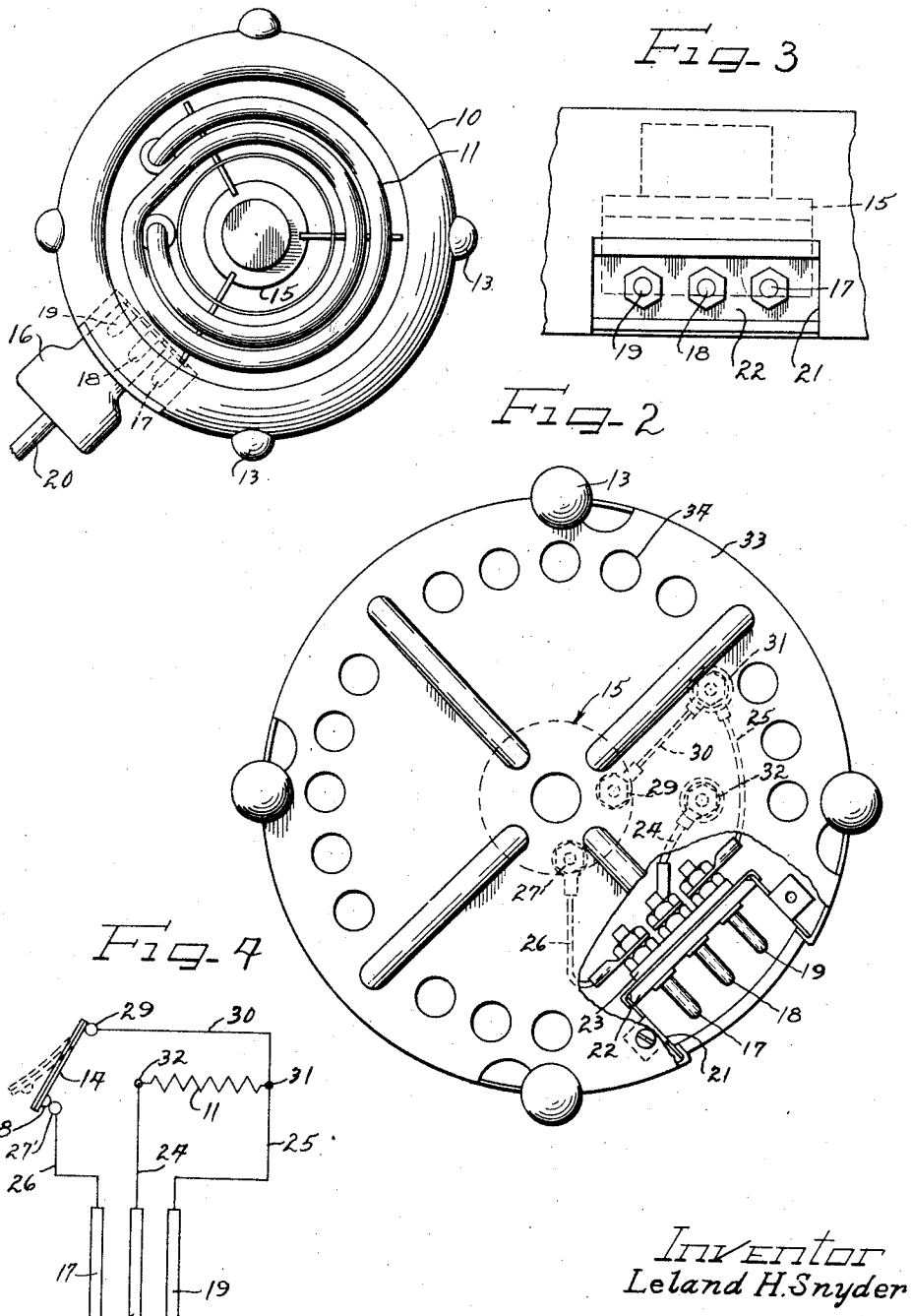
Inventor
Leland H. Snyder
by The Firm of Charles W. Hills Attys Patented Nov. 4, 1947

2,430,194

UNITED STATES PATENT OFFICE 2,430,194

ELECTRIC HOT PLATE

Leland H. Snyder, Chicago, Ill., assignor, by mesne assignments, to Quality Appliances, Inc., Chicago, Ill., a corporation of Illinois Application May 2, 1945, Serial No. 591,456

1 Claim. (Cl. 219—37)

This invention relates to electric hot plates provided with thermostatic control for regulating the temperature thereof.

My invention makes it possible to be able to obtain from a single hot plate a high cooking temperature continuously, or selectively to attain such a high temperature, and thereafter to be able to keep the cooking vessel hot by alternately deenergizing and energizing the heating coil. Thus the hot plate serves in one manner to continuously heat the cooking vessel until it is removed manually or the heating coil is disconnected manually. In its other role the hot plate will be deenergized thermostatically for a period dependent upon the cooling period of the particular thermostat employed, and as it may be affected by the overlying cooking vessel.

The desired results are obtained in this invention by means of a very simple construction and which has the further advantage of being least likely to get out of order. One of the frequent causes of maintenance troubles in electric devices are the manually operated switches that are often employed. In my invention no such switch is needed, rather, the plug supplying the electric current to the hot plate is merely shifted from one pair of terminals to another pair of terminals.

One of the objects of my invention therefore is to provide a hot plate which may selectively be employed to furnish continuously a high temperature for rapid cooking, or to furnish a high cooking temperature interrupted under the control of a thermostat.

Another object of the invention is to provide an electric hot plate for the production of continuous or interrupted heating selectively, the selection being accomplished merely by shifting an ordinary electric cord plug from one pair of terminals to another pair of terminals in an assembly of three equally spaced terminals.

Another object of the invention is to provide in an electric hot plate three terminals, two of which may be used to supply a continuous current to the heating element in the plate, while the third terminal and one of the first two mentioned may be used to place a thermostatically controlled switch in series with the heating element to open the circuit therethrough whenever a predetermined temperature has been attained at the position of the thermostat.

By providing a thermostat designed to open the switch contacts at a predetermined temperature, one can, for example, use the thermostatically controlled circuit to cause switch contacts to open and to cut off the heating element whenever a liquid in a container carried on the hot plate reaches its boiling point, or, if so regulated to operate at a higher temperature, when all or substantially all of the liquid has boiled out of the container.

When thermostatic control is not desired the hot plate may serve to continuously boil or otherwise heat foods placed thereupon.

Such possible uses and other uses and objects of the invention will be apparent to those skilled in the art from the following detailed description of the annexed sheet of drawings which, by way of example only, illustrates a preferred embodiment of the invention.

In the drawings:

Figure 1 is a top plan view of a hot plate made in accordance with my invention;

Figure 2 is a bottom plan view of the same device with a portion cut away to show the terminals;

Figure 3 is a partial end elevation of the device looking toward the three terminals; and Figure 4 is a diagrammatic showing of the electrical circuit employed in the device.

This invention is not concerned with the details of construction of the casing, or the heating grid or its assembly in the hot plate.

For the present disclosure it is sufficient to state that a casing generally indicated as 10 supports the electrical heating grid 11 and rests upon a plurality of feet 13, preferably of a heat insulating character. A thermostatic element, schematically indicated as 14, is mounted in the hot plate in such a manner as to be responsive to the temperature at the bottom of the cooking vessel mounted on the device. Preferably, this is accomplished by having a liquid proof housing 15 in which is disposed a thermostatic element of any desired character, suitable to the objectives of the invention, and having the top of the housing positioned to contact the bottom of a cooking vessel (not shown) when resting upon the electric grid 11. Preferably this housing may be resiliently supported to assure firm contact of its top surface with the vessel. If it be desired that the liquid in the cooking vessel be maintained at not exceeding a predetermined temperature by means of the automatic opening and eventual closing of the thermostat upon cooling thereof, repeated in cycles, a thermostat of the required characteristics will be mounted in this housing. Obviously, thermostats having other functional purposes may equally well be mounted in this housing.

In accordance with my invention the thermostat will be connected, as shown in Figure 4, in series with the heating element 11, by connecting the plug 16 to the terminals 17 and 18.

Whenever it is desired to take the thermostat out of circuit the plug 16 will be removed from terminals 17 and 18, and connected to the terminals 18 and 19.

The plug 16 will be of ordinary construction having two sockets or sleeves to receive the terminal members provided on the hot plate and connected to a cord 20 leading to the source of supply for electricity.

As shown in Figure 2 and 3, a recess indicated as 21 is provided in the casing in which to locate the terminals where they may conveniently be reached by the plug 16. These terminals are securely mounted and provided with the usual electrical insulation, in any approved manner. For example, the insulating strips 22 and 23 may be provided and at the inner ends of the terminals the leads 24, 25 and 26 may be connected as indicated both in Figure 2 and Figure 4.

The lead 26 connects terminal 17 to binding post 27, which is directly connected to switch contact 27'. This thermostatically controlled circuit continues through the other switch contact 28, through the thermostat 14, to binding post 29, lead 30, binding post 31, heating coil 11, binding post 32, lead 24 and thence to terminal 18.

The other circuit omitting the thermostat runs from terminal 18, lead 24, post 32, heating coil 11, post 31, lead 25, and to terminal 19.

A bottom plate 33 for the device is shown in Figure 2, provided with ventilation holes 34, if such holes be desired.

In the operation of the device, the user merely will connect the plug 16, having two sockets or sleeves, either to the terminals 18 and 19, if continuous uninterrupted heating is desired, or to the terminals 17 and 18 if it be desired that the heating be under the control of the thermostat, for opening and closing the contacts 27' and 28.

While the drawing shows a circuit passing through the thermostat 14, and that thermostat is indicated to be a typical bi-metallic element, it should be understood that the element is not heated by the passage of the current. Radiated heat, usually from the cooking vessel, or even some from the heating coil is relied upon to cause the thermostat to open its contacts 27' and 28. Other forms of thermostats, actuated by heat radiated from the cooking surface, may be employed.

Although I have shown and described a particular embodiment of my invention, I do not desire to be limited to the particular embodiment described, and I intend in the appended claim to cover all modifications which are within the purpose and scope of my invention.

I claim as my invention:

An electric hot plate comprising a heating element, a pair of terminals connected therewith and arranged for engagement with a cord plug having a pair of cooperating sockets therein, a third terminal arranged to permit simultaneous engagement by the cord plug with said third terminal and only the first of said pair of terminals, and a thermostatic element positioned in proximity to the bottom of a cooking vessel when placed on the heating element, a switch controlled by said element arranged for connecting said heating element between the third terminal and the second of the said pair of terminals, said thermostatic switch being constructed and arranged to open the circuit therethrough upon the occurrence of a predetermined temperature at the bottom of said vessel.

LELAND H. SNYDER.

REFERENCES CITED

The following references are of record in the file of this patent:

UNITED STATES PATENTS

| Number | Name | Date |
|---|---|---|
| Re. 14,286 | Mann | Apr. 17, 1917 |
| 2,244,580 | Smith | June 3, 1941 |
| 2,230,260 | Owen et al. | Feb. 4, 1941 |